United States Patent [19]

Sellner

[11] 4,377,269
[45] Mar. 22, 1983

[54] STAND FOR OPTICAL DEVICES, PARTICULARLY CAMERAS

[75] Inventor: Kurt Sellner, Langenzenn, Fed. Rep. of Germany

[73] Assignee: Messrs. Cullman Handelsgesellschaft fuer Verbrauchsgueter m.b.H., Langenzenn-Laubendorf, Fed. Rep. of Germany

[21] Appl. No.: 114,493

[22] Filed: Jan. 23, 1980

[30] Foreign Application Priority Data

Jan. 23, 1979 [DE] Fed. Rep. of Germany ....... 2902419

[51] Int. Cl.³ .......................................... F16M 11/38
[52] U.S. Cl. ............................... 248/188.6; 248/188.7
[58] Field of Search ...................... 248/167, 170, 188.6, 248/188.7, 528, 529

[56] References Cited

U.S. PATENT DOCUMENTS

| | | | |
|---|---|---|---|
| 287,168 | 10/1883 | Richardson et al. | 248/170 |
| 1,464,279 | 8/1923 | Hindley | 248/167 X |
| 2,054,600 | 7/1936 | Hoza | 248/167 |
| 2,550,415 | 4/1951 | Kammermeyer | 248/188.6 |
| 2,552,921 | 5/1951 | Anderson | 248/167 |
| 3,262,406 | 7/1966 | Nickolaisen | 248/188.6 X |
| 3,463,437 | 8/1969 | Henderson | 248/188.7 X |
| 3,567,166 | 5/1971 | Granjean | 248/188.6 X |
| 4,061,302 | 12/1977 | Boone | 248/170 |
| 4,214,728 | 7/1980 | Geiger | 248/167 |

FOREIGN PATENT DOCUMENTS

| | | | |
|---|---|---|---|
| 730340 | 11/1943 | Fed. Rep. of Germany | 248/188.7 |
| 1023537 | 3/1966 | United Kingdom | 248/170 |

*Primary Examiner*—William H. Schultz
*Attorney, Agent, or Firm*—Staas & Halsey

[57] ABSTRACT

The invention relates to a stand for optical devices, particularly cameras, wherein a spacer (9) adjustable in length carries a securing head (6) at one end and at its other end legs (15, 16, 17) which are mounted by supporting elements (12, 13, 14) for extension from an inoperative to an operative position. In order that such a stand may be effectively used as a shoulder stand as well as a table stand, it is suggested that the supporting elements (12, 13, 14) for at least two of the legs (15, 16, 17) be rotatable about the spacer (9) so that the legs can be set to form a table stand at a first operative position in which they are substantially equally circumferentially spaced and to form a shoulder stand at a second operative position in which they are diametrally oppositely disposed by at least two of the legs covering or abutting each other.

11 Claims, 5 Drawing Figures

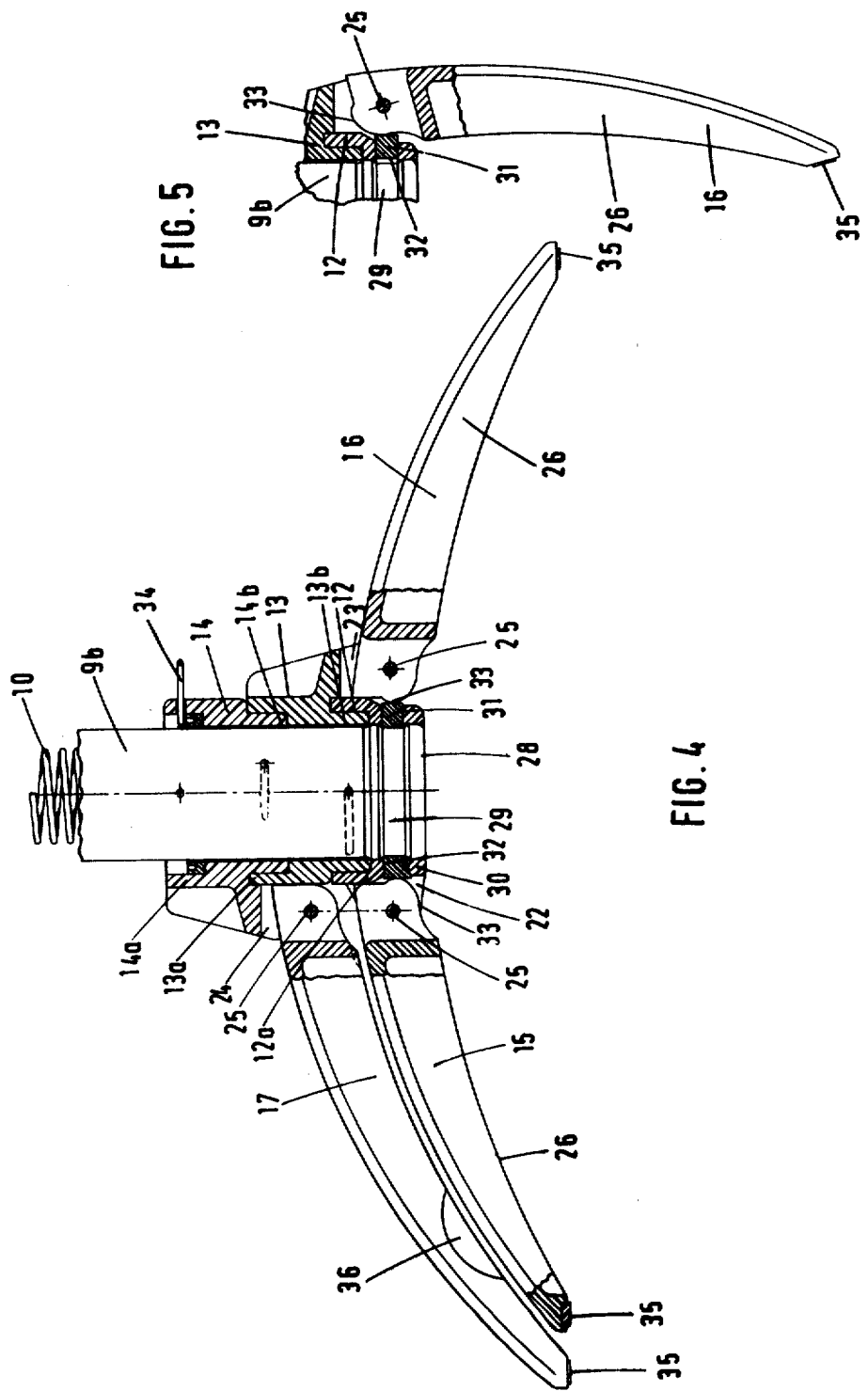

STAND FOR OPTICAL DEVICES, PARTICULARLY CAMERAS

The invention relates to a stand for optical devices, particularly cameras, comprising a securing head for the camera, a spacer articulated thereto and of adjustable length, and at least three legs which are mounted by their inner ends at the lower end of the spacer remote from the securing head by means of supporting elements and are pivotable between an inoperative position substantially parallel to the spacer axis and an extended operative position.

A shoulder stand with the aforementioned features is known from DE-PS No. 2,401,080. It has the advantage that it can be collapsed to relatively small siace when not in use. However, a pronounced disadvantage of this shoulder stand is that use as a table stand, as would so often be desirable, for example for close-up pictures, is impossible or possible only with difficulty because this known stand only has two diametrally opposed legs and can therefore not rest on a table or like support. Use as a table stand is therefore possible only in the form of a support against unintentional change in the distance, whereas lateral movement of the camera secured on the stand can certainly occur.

Table stands of similar construction are also known, in which the legs can be moved to a position parallel to the spacer axis when not in use (DE-GM No. 6933480, DE-GM No. 7036564, DE-GM No. 7112652). These stands have three legs and fulfil their function as table stands. However, their disadvantage is that use as a shoulder stand is impossible and use as a chest stand only rarely because the presence of three legs at substantially equal angular spacings makes it impossible to rest it properly on the use's shoulder or chest.

If a photographer or an amateur using narrow film formats wanted to take exposures with the use of a shoulder stand as well as with a table stand, he hitherto had to acquire separate stands for each purpose, which, of course, involved unnecessarily high costs and in some cases, e.g. on walking trips where shoulder and table stands might be used, constituted an additional burden as far as the weight and available space was concerned.

It is an object of the invention to provide a stand for optical devices, particularly still and cine cameras, which is adapted to meet efficiently the requirements placed on a shoulder stand as well as a table stand, i.e. permits proper location in the user's shoulder region as well as proper positioning on a table or the like.

According to the invention, a stand of the aforementioned kind is constructed so that the supporting elements for at least two of the legs are rotatable about the spacer so that the legs can be set to form a table stand at a first operative position in which the legs are substantially equally circumferentially spaced and to form a shoulder stand at a second operative position in which the legs are diametrally oppositely disposed by at least two of the legs covering or abutting each other.

The basic difference of the stand according to the invention from known stands is therefore that the legs can be turned with respect to the spacer to change the angle between them, whereby it is possible to bring the legs to an equispaced position for resting the stand properly on a table or like surface as well as a position where the legs are diametrally opposed to give an elongate supporting surface for resting near the user's shoulder.

For the first time therefore, the stand of the invention makes it possible for the user to employ one and the same stand as a shoulder stand and a table stand without accepting the aforementioned disadvantages of known table or shoulder stands regarding inadequate support. By using a stand of the invention, one can therefore save the costs of a second stand and it is sufficient to transport one stand, which should often please the user.

In one particularly simple embodiment, the construction is such that the legs are pivoted to a respective lateral pair of lugs of supporting rings which are mounted axially successively on the spacer for rotation thereabout and serve as supporting elements. In this embodiment the legs can be easily turned in relation to the spacer.

The supporting rings mounting the legs should desirably always be held in abutment with each other to facilitate stability especially on use as a table stand. This can be simply achieved in that the supporting rings are provided at their respective edge facing an adjacent supporting ring with an end ring which covers a counter end ring of the adjacent supporting ring and that, to prevent axial movement, the end ring comprises a radially extending pin engaging in a circumferential groove of the associated counter end ring.

In this embodiment it is desirable for the circumferential groove of the counter end ring to extend over an angle of only about 60°, because this also achieves a safeguard against excessive rotation of the legs and sets the operative position of the legs when used as a table or shoulder stand, respectively.

As with usual stand constructions, it will also be appropriate for the stand of the invention to have three legs and thus three supporting rings, the pair of lugs of the second supporting ring as viewed from the lower end of the spacer being disposed adjacent the first supporting ring in a position axially of the spacer that corresponds to the pair of legs of the first supporting ring and the legs pivoted to the first and second supporting ring being identical. In this embodiment, the third supporting ring viewed from the lower end of the spacer preferably corresponds to the second supporting ring and carries a third leg longer than the first and second legs. Such a construction provides the advantage that only two different supporting rings and two different legs are required, which saves manufacturing costs (mould costs) and is also favourable regarding storage of the components for making the stand.

To enable the stand to be collapsed to as small a size as possible when not in use, the supporting elements for the legs are axially displaceable relatively to the spacer and in their operative position can be fixed to the lower end of the spacer by locking means. When not in use, the supporting elements with legs are then displaced on the spacer towards the securing head so that the collapsed legs will not project beyond the lower end of the spacer.

If the stand is provided with supporting rings for the legs, the locking means comprise at least one locking member which is disposed in an aperture of one of the supporting rings in the region of the inner end of one of the legs having a corresponding sloping surface and can be pressed into a circumferential groove of the spacer by means of the sloping surface when this leg is swung open. In this form of locking means, on extending the legs, the supporting ring carrying the clamping member and hence all the other supporting rings connected thereto are automatically locked against axial displacement. A particularly secure lock is in this case obtained if in the first supporting ring as viewed from the lower end of the spacer there are accommodated two clamping members, the clamping member associated with the second leg extending over a circumferential angular range corresponding to the possible turning angle of the second supporting ring relatively to the first supporting ring, so that locking is ensured by way of the second clamping member in both feasible positions of the second leg relatively to the first leg. The clamping members are preferably outwardly converging members of generally light elastic material loosely arranged in the complementary converging apertures of the respective supporting ring. Because of the converging taper, no special retainers are provided for the clamping members. The clamping members could only drop into the supporting ring but this is prevented by the spacer at that location.

It is also within the scope of the invention for at least one of the supporting elements for one of the legs to be securable against rotation relatively to the spacer to achieve an accurately defined position relatively to the securing head under certain circumstances. In the presence of supporting rings displaceable axially of the spacer, this can be achieved in a simple manner in that the first supporting ring associated with the lower end of the spacer has at least one axial groove which is open towards the spacer and in which a projection at the outer face of the spacer near the lower end thereof is insertable when the first supporting ring is appropriately axially displaced. In this way, rotation is prevented automatically when the legs are brought to their operative position, without the need for major additional constructional expense.

To facilitate a good support for the stand when used as a shoulder stand, at least the legs serving as support in the second operative position are preferably curved to form a concave supporting face.

The invention will now be described in more detail with reference to a preferred example shown in the drawing, wherein:

FIG. 4 is an axial cross-section through the lower end of the stand in the second operative position, i.e. when used as a shoulder stand; and FIG. 5 shows the rignt-hand first leg in FIG. 4 with the adjoining first supporting ring region in the inoperative position.

Figures 1, 2:
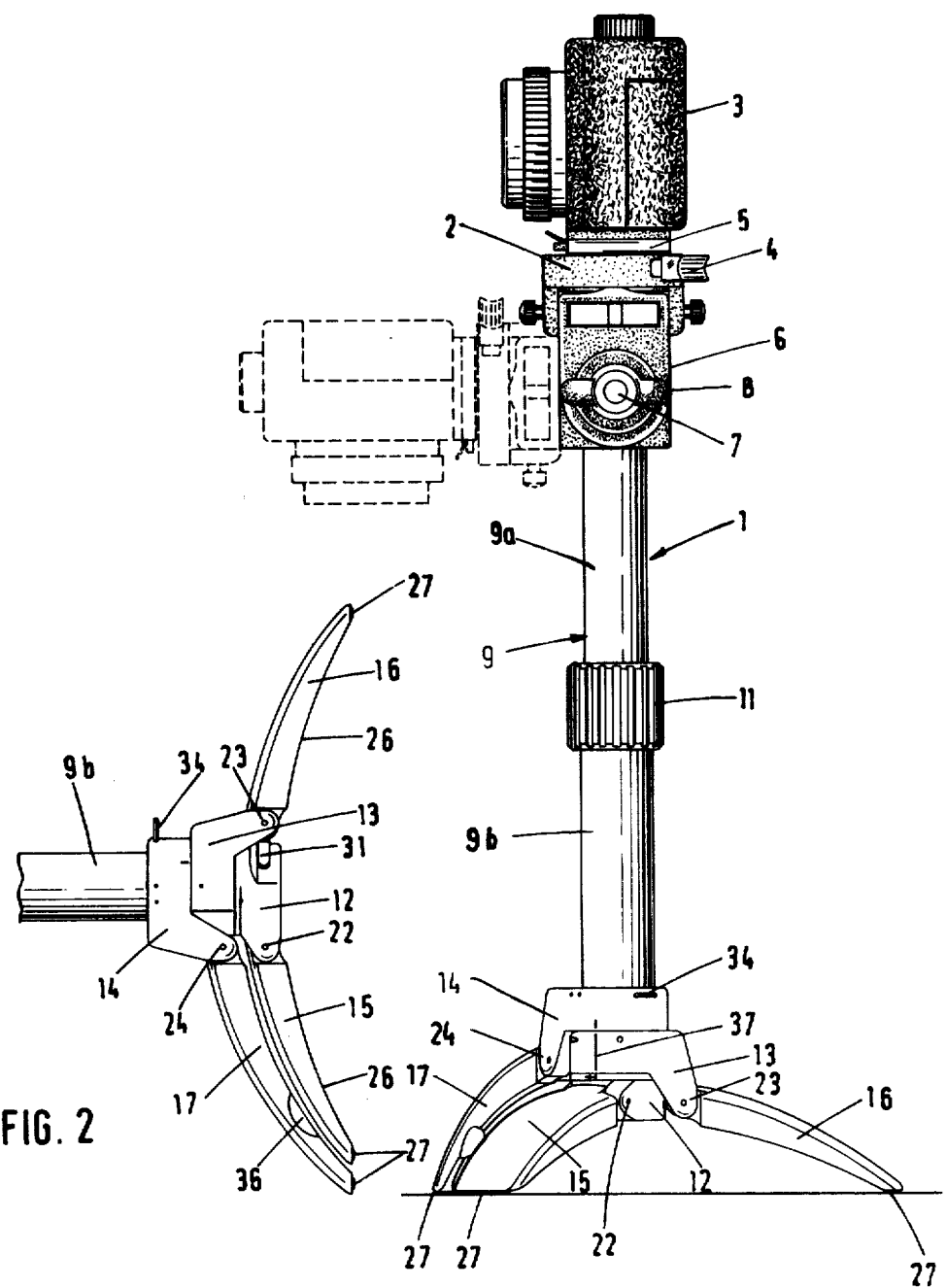
FIG. 1 is a side elevation of the stand when used as a table stand.
FIG. 2 is a side elevation of the lower end of the stand when used as a shoulder stand.

The stand generally designated 1 comprises a securing head 2 for a camera 3 which can for example be located on the head 2 by way of a quick make and break coupling 5 by means of an actuator head 4. The securing head 2 is part of an inclining head 6 which is known in principle and permits tilting about the shaft 7 into the position shown in broken lines in FIG. 1 after loosening the set screw 8.

The inclining head 6 is secured to the upper end of the spacer 9 consisting of the telescopically interengaging tubes 9a and 9b. The tubes 9a and 9b of the spacer can be pushed into each other to change its length, a spring 10 (FIG. 4) provided in the tubes 9a and 9b biassing the tubes into the FIG. 1 position of longest length. To set a particular length of spacer 9, there is a clamping nut 11 screwed onto a thread at the upper end of the lower tube 9b.

By means of three supporting rings 12, 13, 14, three legs 15, 16, 17 are mounted on the lower tube 9b of spacer 9 to be foldable together, rotatable about the tube 9b of spacer 9 as well as axially displaceable with respect to tube 9b.

The nature of mounting the legs 15, 16, 17 on the tube 9b by means of the supporting rings 12, 13, 14 is evident particularly from a comparison of FIGS. 1 and 4. It will be seen that the supporting rings 12, 13, 14 each carry an end ring 12a, 13a and in principle also 14a at their edge or end facing the adjacent supporting ring. The end ring 14a of the third supporting ring 14 is provided only because this supporting ring 14 is made identical with the supporting ring 13 in order to save components. Similarly, the legs 15 and 16 are also identical. The end rings 12a and 13a of the supporting rings 12 and 13 embrace the outsides of respective counter end rings 13b, 14b of the supporting rings 13 and 14. The first supporting ring 12 does not have such a counter end ring because it is not adjoined by a further supporting ring at the bottom. The end rings 12a and 13a are locked to the counter end rings 13b and 14b such that mutual axial displacement of the supporting rings 12, 13, 14 is impossible. For this purpose there is a locking pin 18 which is passed through the respective end ring 12a, 13a from the outside and the inner end of which engages in a circumferential groove 19 of the counter end ring 13b or 14b. As evident from FIG. 4, the circumferential grooves 19 of the counter end rings 13b, 14b extend over only part of the circumference, namely so that mutual rotation of the supporting rings 12, 13, 14 is in each case possible only through 60°, which is sufficient to enable the legs 15, 16, 17 to be brought into the operative positions shown in FIGS. 1 and 2 or 3 and 4, respectively.

Figure 3:
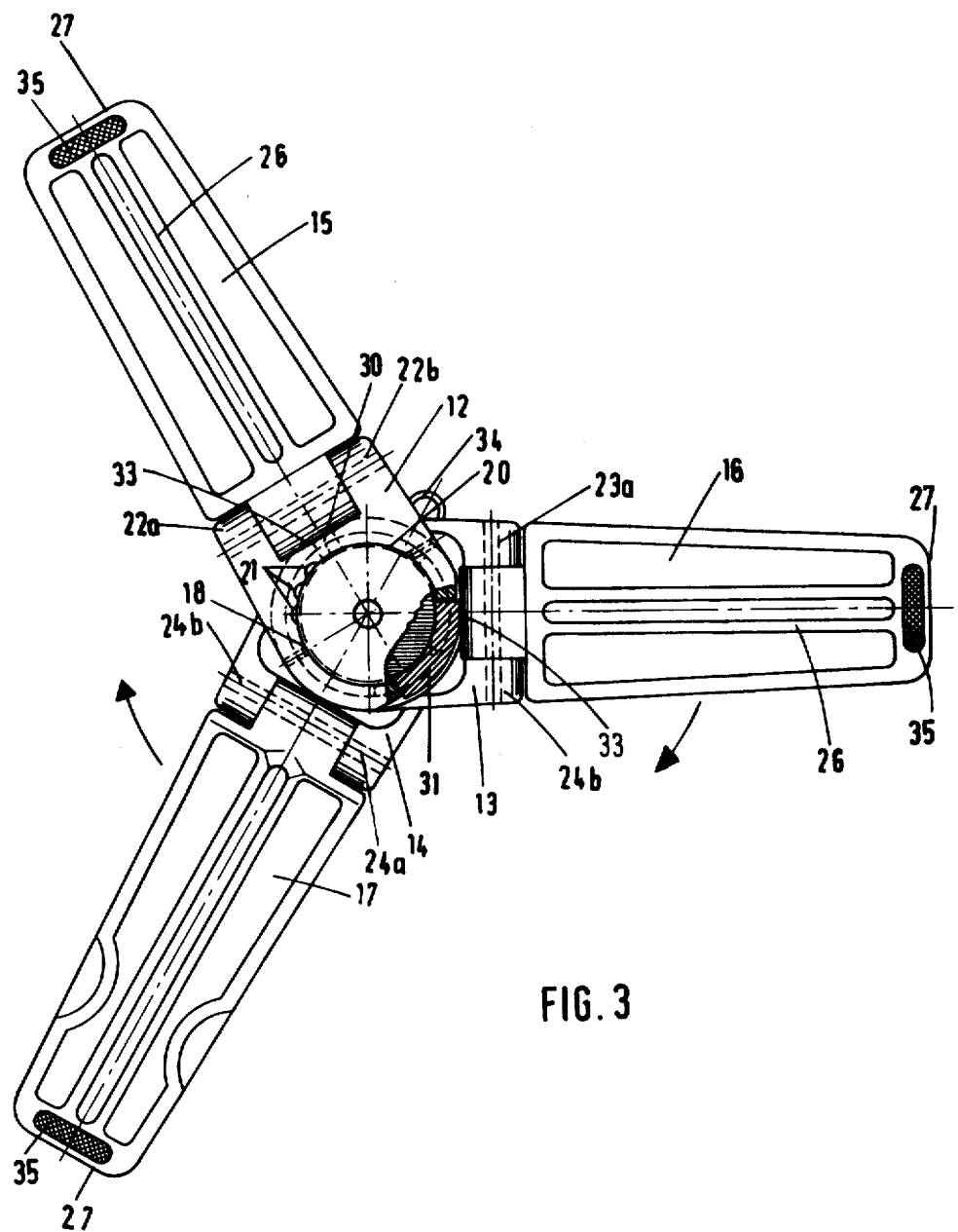
FIG. 3 is an underpin of the stand, the legs being in the first operative position (table stand)

As explained, rotation of the second supporting ring 13 and the third supporting ring 14 relatively to the first supporting ring 12 is limited by the cooperation of the locking pings 18 with the circumferential grooves 19. To prevent unintentional rotation of the first supporting ring 12 with respect to the tube 9b, this supporting ring 12 has three axial grooves 21 at its inner face 20 in the example shown in FIG. 3. When the supporting rings 12, 13, 14 are moved into the lower limiting position according to FIG. 4, a projection (not shown) on the outside of the tube 9b of the spacer near the lower end thereof engages in one of these axial grooves 21 so that unintentional turning of the supporting ring 12 is prevented relatively to the tube 9b. FIG. 3 shows three axial grooves 21 but of course the number can be changed. For example, a single axial groove 21 would suffice.

It will be evident from the drawing, especially FIGS. 2 and 4, that the legs 15, 16, 17 are mounted in a very particular manner by means of the supporting rings 12, 13, 14. To mount the legs 15, 16, 17, the supporting rings 12, 13, 14 each comprise two lugs 22a, 22b, 23a, 23b and 24a, 24b traversed by the respective pivot 25 for mounting the inner end of the legs 15, 16, 17.

As shown particularly clearly in FIGS. 1 and 2, the supporting rings 12 on the one hand or 13 and 14 on the other hand are so constructed that in the finally assembled stand the pair of lugs 22 of the first supporting ring 12 is at the same level as is the pair of lugs 23 of the second supporting ring 13, i.e. the pair of lugs 23 of the supporting ring 13 is extended downwardly into the region of the first supporting ring 12. Since the supporting ring 14 corresponds to the ring 12, the pair of lugs 24 of the supporting ring 14 likewise extends into a region adjacent the supporting ring 13. Since the pivots 25 for legs 15 and 16 are in the same axial position in relation to the tube 9b by reason of the special construction of the supporting rings 12 and 13, it is of course possible to make the legs 15 and 16 identical. However, the leg 17 which is mounted in a different axial position must, to achieve a proper equilibrium for the stand, be longer as shown in FIG. 4.

It may be pointed out at this stage that the legs 15, 16, 17 and in any case the downwardly directed faces 26 of the equally long legs 15 and 16 should be concavely curved preferably in the manner of FIG. 4 to obtain proper abutment of the stand in the region of the shoulder during use as a shoulder stand according to FIG. 2. The curvature of leg 17 would not be absolutely necessary but is desirable to adapt to the form of legs 15 and 16.

As already mentioned, the supporting rings 12, 13, 14 with the legs 15, 16, 17 are axially displaceable in relation to the spacer 9, namely to an extent such that, when the stand 1 is not in use, the free ends 27 of the collapsed legs 15, 16, 17 are substantially flush with the lower end 28 of tube 9b. In this case there must of course be provision for locking the supporting rings 12, 13, 14 or legs 15, 16, 17 in their operative position at the lower end of tube 9b. For this purpose, the tube 9b is provided near its lower end 28 with a circumferential groove 29 into which two clamping members 30, 31 (FIGS. 3, 4, 5) can be pressed. The clamping members 30, 31 are moulded members mounted in apertures 32 of the first supporting ring 12; they extend through the entire wall of supporting ring 12 and have an outwards slightly conically tapered cross-section. In this way the clamping members 30, 31 are prevented from falling out outwardly. Falling out inwardly of the supporting ring 12 is prevented in that the tube 9b or its end cap with circumferential groove 29 is seated in the bore of supporting ring 12.

As particularly evident from a comparison of FIGS. 4 and 5, the clamping members 30, 31 cooperate with sloping surfaces 33 at the inner end of the equally long legs 15, 16 in such a way that, with the legs 15, 16 extended, the clamping members 30, 31 are pressed into the circumferential groove 29 (FIG. 4), whereas when the legs are folded inwardly the clamping members 30, 31 can be moved outwardly into the FIG. 5 position. In the position of FIG. 4 where the legs are extended, the clamping members 30, 31 engaging in the circumferential groove 29 thus prevent axial displacement of the supporting ring 12 and therefore also of supporting rings 13, 14 and legs 15, 16, 17 relatively to the tube 9b, whereas such axial displacement is readily possible when the legs are collapsed as in FIG. 5.

The clamping members 30, 31 are of different construction. As shown in broken lines in FIG. 3, the clamping member 30 extends only over a very small anle. This is sufficient because leg 15 is mounted direct on the supporting ring 12 and consequently no rotation can take place relatively to the clamping member 30. In contrast, the clamping member 31 extends over an angular range of at least 60°, as is clearly shown in FIG. 3. This angular extent of clamping member 31 is necessary because leg 16 can be turned through 60° relatively to leg 15 in the direction of the arrow. A clamping effect can therefore be achieved only if the sloping surface 33 of leg 16 is able to cooperate with the clamping member 31 in each of these positions.

Finally, it may be mentioned that the third supporting ring 14 has an eye 34 which permits the stand 1 with any optical device secured thereto, e.g. a still or cine camera, to be suspended from a strap or the like so that it is possible to carry the stand slung from the shoulder. This eye 34 in conjunction with a strap also possibly facilitate manipulation of a particularly heavy cine camera.

To increase resistance to slipping, the free ends of legs 15, 16, 17 are provided with suitable friction coverings 35, for example rubber shims which may be partially set into the legs as shown in FIG. 4.

The longer leg 17 in addition has finger recesses 36 to facilitate operation.

The stand of the invention is handled as follows:

It is assumed that the stand is in the inoperative position, i.e., the tubes 9a, 9b are telescoped and the supporting rings 12, 13, 14 with the collapsed legs are in the upper limiting position, i.e. abut the clamping screw 11, so that the free ends 27 of the legs 15, 16, 17 are flush with the lower end of spacer 9.

If the stand is now to be used as a table stand, the supporting rings are rotationally aligned according to the markings 37 shown in FIG. 1 and the supporting rings 12, 13, 14 with the legs 15, 16, 17 are then pushed to the lower limiting position of FIG. 1. In this position, the longer leg 17 is first folded open and then the shorter legs 15, 16 are likewise folded outwardly. The unfolding of legs 15 and 16 causes the clamping members 30, 31 to be pressed into the circumferential groove 29 of spacer 9, whereby the supporting rings 12, 13, 14 are locked against axial movement with respect totube 9b. During downward displacement of supporting rings 12, 13, 14 into the operative position, the projection (not shown) is simultaneously introduced in one of the axial grooves 221, whereby the legs 15, 16, 17 are also secured against undesired rotation relatively to spacer 9.

For use as a table stand it is now only necessary to set the desired height by loosening the clamping screw and appropriately mutually displacing tubes 9a, 9b, the clamping screw 11 being retightened after the height has been reached. The camera position must also be set appropriately by means of the inclining head 6.

If the stand is to be used as a shoulder stand instead of a table stand, starting from the first operative position as a table stand as in FIG. 1, at least the second leg 16 must be folded inwards again in order thereby to reduce the pressure on the clamping member 31 and hence the friction between the clamping member 31 and the base of the circumferential groove 29; otherwise rotation of the supporting ring 13 with leg 16 would be practically impossiblerelatively to supporting ring 12 which is stopped from turning by the axial groove 21.

After releasing the lock, assuming that the leg 15 is fixed, the leg 16 is turned through 60° (clockwise in FIG. 3). In the course of this rotation of the second leg 16, the third leg 17 is also turned through 60°. Thereafter, the third leg 17 can be turned through a further 60° into the FIGS. 2 and 4 position in which it covers the first leg 15. After turning leg 16 through 60° clockwise and leg 17 through 120° clockwise as viewed in FIG. 3, one obtains the second operative position of FIGS. 2 and 4, in which the stand can be used as a shoulder stand. Before use, the second leg 16 has to be folded outwardly, whereby the clamping member 31 is again pushed tightly into the circumferential groove 29.

If the stand is to be collapsed, after folding the legs 15 and possibly 16 inwardly, the legs 15, 16, 17 must be brought into the first operative position for use as a table stand where they are equispaced. The legs 15 and 16 may remain in their inwardly folded inoperative position. As soon as this has been done, the supporting rings 12, 13, 14 can be pushed upwardly towards the clamping screw 11 by means of the leg 17. When the appropriate position has been reached, the leg 17 is also folded inwards. It is also conceivable to fold leg 17 inwardly even before the ring are displaced.

Finally, it is pointed out that the basic concept of the invention is of course applicable to stands with four legs instead of just tripods. In that case, there could be two legs on a respective common supporting ring and mutual rotation of the pairs of legs would be necessary only through 90° for transition from the first operative position as table stand to the second operative position as shoulder stand.

I claim:

1. A stand for optical devices, particularly cameras, comprising a securing head for the camera, a spacer articulated thereto and of adjustable length, and at least three legs which are mounted by their inner ends at the lower end of the spacer remote from the securing head by means of supporting elements and each leg being individually pivotable about an axis essentially perpendicular to the spacer axis between an inoperative position, substantially parallel to the spacer axis and an extended operative position, wherein the supporting elements for at least two of the legs are rotatable about the spacer so that the legs can be set to form a table stand at a first operative position in which the legs are substantially equally circumferentially spaced and to form a shoulder stand at a second operative position in which two of the legs are diametrally oppositely disposed and with two of the legs adjacent each other.

2. The stand of claim 1, wherein the legs are pivoted to a respective lateral pair of lugs of supporting rings which are mounted axially successively on the spacer for rotation thereabout and serve as supporting elements.

3. The stand of claim 2, wherein the supporting rings are provided at their respective edge facing an adjacent supporting ring with an end ring which covers a counter end ring of the adjacent supporting ring and that, to prevent axial movement, the end ring comprises a radially extending locking pin engaging in a circumferential groove of the associated counter end ring.

4. The stand of claim 3, wherein the circumferential groove of the counter end ring extends over an angle of only abut 60°.

5. The stand of claim 2, wherein three legs and thus three supporting rings are provided, that the pair of lugs of the second supporting ring as viewed from the lower end of the spacer is disposed adjacent the first supporting ring in a position axially of the spacer that corresponds to the pair of lugs of the first supporting ring, and that the legs pivoted to the first and second supporting ring are identical.

6. The stand of claim 5, wherein the third supporting ring viewed from the lower end of the spacer corresponds to the second supporting ring and carries a third leg longer than the first and second legs.

7. The stand of claim 1, wherein the supporting elements for the legs are axially displaceable relatively to the spacer and in their operative position can be fixed to the lower end of the spacer by locking means.

8. The stand of claim 7, wherein the locking means comprises at least one clamping member which is disposed in an aperture of one of the supporting rings in the region of the inner end of one of the legs having a corresponding sloping surface and can be pressed into a circumferential groove of the spacer by means of the sloping surface when this leg is swung open.

9. The stand of claim 1, wherein at least one of the supporting elements for one of the legs is securable against rotation relatively to the spacer.

10. The stand of claim 1, 2, 5, or 7, wherein at least the legs serving as support in the second operative position are curved to form a concave supporting surface.

11. A device for supporting an optical device such as a camera, comprising:
 a securing head for a camera;
 an adjustable length spacer articulated thereto;
 at least three legs on corresponding supporting elements at the other end of the spacer from the securing head; and
 means included with said supporting elements for permitting said legs to be arranged to form either a table stand in a first position thereof or to form a shoulder stand in a second position thereof for the purpose of permitting use of the device in two completely different ways both of which permit correct positioning of a camera in order to obtain good quality photographs therewith, including the provision for each of said supporting elements being both rotatably as well as slidably mounted, and for each leg to be pivotally mounted from its respective supporting element.

* * * * *